(12) United States Patent
Chen et al.

(10) Patent No.: US 9,731,851 B2
(45) Date of Patent: Aug. 15, 2017

(54) PACKAGING SYSTEMS WITH CLIP BLOW OFF AND RELATED CLIPPER ASSEMBLIES, METHODS AND COMPUTER PROGRAM PRODUCTS

(71) Applicant: Tipper Tie, Inc., Apex, NC (US)

(72) Inventors: Kuo-Raid Grant Chen, Cary, NC (US); Dennis J. May, Pittsboro, NC (US); Ronald H. Neely, Jr., Holly Springs, NC (US)

(73) Assignee: Tipper Tie, Inc., Apex, NC (US)

( * ) Notice: Subject to any disclaimer, the term of this patent is extended or adjusted under 35 U.S.C. 154(b) by 390 days.

(21) Appl. No.: 14/508,142

(22) Filed: Oct. 7, 2014

(65) Prior Publication Data

US 2015/0128524 A1    May 14, 2015

Related U.S. Application Data

(60) Provisional application No. 61/901,810, filed on Nov. 8, 2013.

(51) Int. Cl.
| | |
|---|---|
| *B65B 51/04* | (2006.01) |
| *B29C 33/46* | (2006.01) |
| *A22C 11/12* | (2006.01) |

(52) U.S. Cl.
CPC ............ *B65B 51/04* (2013.01); *A22C 11/125* (2013.01); *Y10T 29/49718* (2015.01)

(58) Field of Classification Search
CPC ....... B65B 51/04; A22C 11/125; B29C 33/44; B29C 33/46

USPC ........ 221/156, 171, 173, 278; 209/543, 644; 53/138.2

See application file for complete search history.

(56) References Cited

U.S. PATENT DOCUMENTS

| | | | | |
|---|---|---|---|---|
| 3,941,537 A | * | 3/1976 | Abraham | B05B 3/06 118/316 |
| 4,004,339 A | * | 1/1977 | Velarde | B65B 51/04 29/243.56 |
| 4,094,182 A | * | 6/1978 | Kusada | B21D 37/18 72/344 |
| 4,578,928 A | * | 4/1986 | Andre | B65B 31/022 53/373.4 |
| 4,821,485 A | * | 4/1989 | Evans | B65B 9/15 29/243.57 |
| 5,020,298 A | * | 6/1991 | Evans | A22C 11/108 29/243.57 |
| 5,085,036 A | | 2/1992 | Evans et al. | |
| 5,203,760 A | | 4/1993 | Chen et al. | |
| 5,240,118 A | * | 8/1993 | Mayer | A61J 3/06 198/380 |
| 5,259,168 A | | 11/1993 | Evans et al. | |

(Continued)

*Primary Examiner* — Gloria R Weeks
(74) *Attorney, Agent, or Firm* — Christensen O'Connor Johnson Kindness PLLC

(57) ABSTRACT

Embodiments of the invention provide clip blow-off pulses of pressurized gas to clip dies using pressurized gas diverted from an onboard knife, gate and/or punch cylinder/valve during a reset or idle period of a clipping cycle and may be particularly suitable for rotating platform systems with circumferentially spaced apart respective clipper stations. Packaging systems include at least one clipper assembly with at least one pulse valve in communication with a pressurized gas (e.g., air) supply configured to generate a respective clip blow-off pulse of pressurized gas across a clip die.

14 Claims, 14 Drawing Sheets

(56) References Cited

U.S. PATENT DOCUMENTS

| | | | | |
|---|---|---|---|---|
| 5,419,442 A | * | 5/1995 | Wright, Jr. | B07C 5/36 198/391 |
| 5,458,458 A | * | 10/1995 | Tada | F16K 11/0525 415/150 |
| 5,471,815 A | * | 12/1995 | Evans | A22C 11/108 29/243.57 |
| 5,495,701 A | | 3/1996 | Poteat et al. | |
| 5,586,424 A | | 12/1996 | Chen et al. | |
| 5,644,896 A | * | 7/1997 | Evans | A22C 11/108 29/243.56 |
| 6,920,738 B2 | | 7/2005 | Wilkins et al. | |
| 7,258,222 B2 | * | 8/2007 | Marti Sala | B65G 47/1464 198/393 |
| 7,284,665 B2 | * | 10/2007 | Fuchs | A23N 12/06 209/270 |
| 8,006,463 B2 | * | 8/2011 | May | A22C 11/125 452/48 |
| 8,272,191 B2 | * | 9/2012 | May | A22C 11/125 452/48 |
| 8,360,270 B1 | * | 1/2013 | McClosky | G07F 11/44 177/116 |
| 9,010,072 B2 | * | 4/2015 | May | A22C 21/00 53/138.3 |
| 2009/0151305 A1 | * | 6/2009 | Cassoni | B67B 3/0645 53/485 |
| 2010/0200369 A1 | * | 8/2010 | Suutarinen | B23Q 11/005 198/495 |

\* cited by examiner

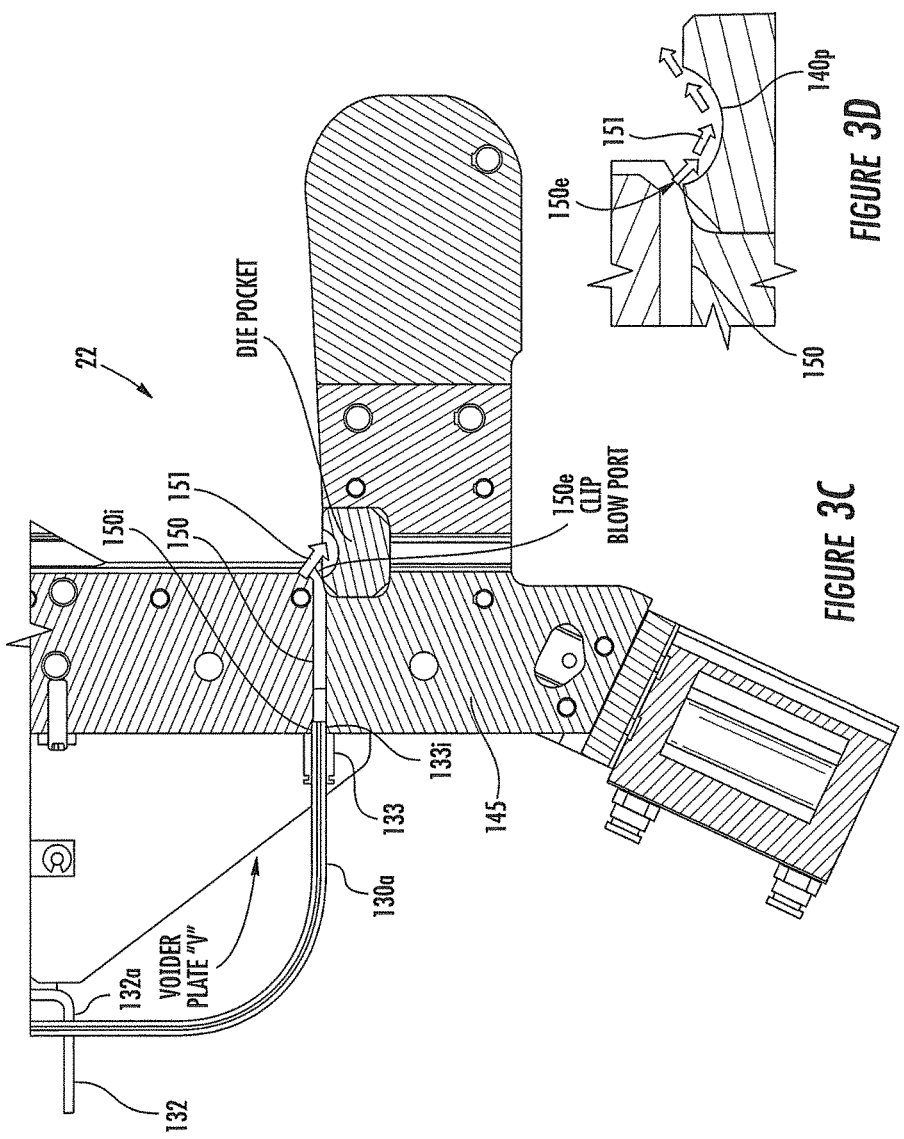

PACKAGING SYSTEMS WITH CLIP BLOW OFF AND RELATED CLIPPER ASSEMBLIES, METHODS AND COMPUTER PROGRAM PRODUCTS

RELATED APPLICATIONS

This application claims the benefit of and priority to U.S. Provisional Application Ser. No. 61/901,810, filed Nov. 8, 2013, the contents of which are hereby incorporated by reference as if recited in full herein.

FIELD OF THE INVENTION

The present invention relates to clipper assemblies for packaging systems.

BACKGROUND OF THE INVENTION

Conventionally, in the production of goods such as, for example, explosives, meat or other products, the product is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together a thin sheet of flexible material, typically elastomeric and/or polymeric material. U.S. Pat. Nos. 5,085,036 and 5,203,760 describe examples of automated substantially continuous-feed devices suitable for forming sheet material or flat roll stock into tubular film casings.

Rotating multi-clipper platform systems, such as the Rota-Clip® high speed packaging system by Tipper Tie, Apex, N.C., have been used to produce increased quantities of clipped product. See, e.g., U.S. Pat. Nos. 4,821,485; 5,020,298; 5,259,168; 5,471,815; 5,644,896 and 8,006,463. The contents of the above referenced patents are hereby incorporated by reference as if recited in full herein.

It is well known that clippers have been configured to have clip-blow off operation to keep the clip die clean and/or to eject unwanted clip material that may remain in the die before a subsequent clip cycle. However, there remains a need to configure clippers with clip-blow off capacity that can operate in an efficient and reliable manner.

SUMMARY OF EMBODIMENTS OF THE INVENTION

Embodiments of the invention provide clip blow-off pulses of pressurized gas to clip dies using pressurized gas diverted from an onboard knife, gate and/or punch cylinder/valve during a reset or idle period of a clipping cycle.

Embodiments of the invention are particularly suitable for rotating platform systems with circumferentially spaced apart respective clipper stations.

Embodiments of the invention are directed to packaging systems that include a rotating table and a plurality of circumferentially spaced apart clipper assemblies held at respective clipper stations. Each clipper assembly includes at least one pulse valve in communication with a pressurized gas (e.g., air) supply configured to generate a respective clip blow-off pulse of pressurized gas across a clip die.

In some embodiments, each clipper assembly can have a single pulse valve that concurrently supplies first and second clip blow-off pulses of pressurized air to different clip dies.

Each clipper assembly pulse valve can be connected to (i) at least one of a punch valve or a gate valve, (ii) a downwardly extending conduit, and (iii) an extension chamber.

The clipper assemblies can have dual clipper configurations.

The systems can include, for each clipper, a downwardly extending first (external) conduit with a diameter that has an upper end portion that is in fluid communication with a respective pulse valve and that has an opposing lower end portion that connects to second and third smaller diameter conduits. The smaller diameter conduits can travel down a distance from the first conduit lower portion then turn inward at an angle that is substantially orthogonal to the first conduit. The second smaller conduit can attach to a right hand die support and the third smaller conduit can attach to a left hand die support. The right hand and left hand die supports can have laterally extending air channels with respective exit ports that reside adjacent a corresponding clip die and supply the pulse of pressurized gas to the clip dies.

The at least one pulse valve can reside proximate an upper portion of respective clipper assemblies. The at least one pulse valve can be attached to at least one downwardly extending conduit with upper and lower ends. The upper end can be configured to attach directly or indirectly to a respective pulse valve and the lower end can be configured to attach directly or indirectly to a die support with a laterally extending channel that has an open end with a clip blow off port.

The clipper assemblies can include right hand and left hand die supports with respective laterally extending channels that have an outer edge facing a respective clip die that is angled to direct pressurized air from the laterally extending channels down and across a die pocket of the clip die.

The clipper assemblies can each include a punch cylinder in communication with a punch valve and a gate valve in communication with a gate cylinder. At least one of the at least one pulse valve for a respective clipper assembly is in fluid communication with the punch valve or the gate valve (or both). The punch and/or gate valve can supply pressurized air for driving a clip down against the clip die then supply pressurized air to the pulse valve.

Each clipper assembly can include a single pulse valve for supplying the clip blow off pulse of pressurized gas. Each clipper assembly can include a downwardly extending conduit that has an upper end that is directly or indirectly attached to the single pulse valve and a lower end that directly or indirectly connects to a channel extending across a die support to supply the clip blow off pulse to the clip die.

Each clipper assembly can include: (a) a first external conduit segment that has a first end portion that is connected to a punch valve, knife valve or a gate valve held by a respective clipper assembly and that has a second end portion that is connected to one or more of the at least one pulse valve, (b) a second external conduit segment that has an upper end that is attached to a corresponding one or more of the at least one pulse valve and a lower end that is attached to a connector; and (c) a third external conduit segment with a pair of side by side downwardly extending conduits that are in fluid communication with the second external conduit and have respective upper ends that attach to the connector and extend down a distance therefrom, then turn inward to attach to respective laterally extending channels in die supports.

Each clipper assembly can also include a fourth external conduit segment that is attached to an end of the pulse valve away from the first conduit attachment end and defines an extension chamber.

Each clipper assembly can include: (a) at least one clip die support holding a respective clip die, wherein the at least one clip die support comprises at least one air channel therein that extends across to an exit port adjacent the clip die; (b) a punch valve, punch cylinder and punch for applying clips to a target product casing; (c) a gate assembly having a gate valve and gate cylinder that closes a gate and opens the gate; and (d) at least one air line extending from the pulse valve to the at least one die support. In operation, the clip blow-off pulse of pressurized air can travel from the pulse valve to the at least one air line, then to the air channel and out of the exit port. The pulse valve can be connected to the gate valve, the punch valve or both for the pressurized air.

The clipper assemblies can have a dual clipper configuration. The clipper assemblies can include: (a) first and second clip die supports holding a respective clip die, wherein the first and second clip die supports comprise at least one air channel therein that extends across to a respective clip blow off port proximate a corresponding clip die; (b) a punch cylinder with a punch valve configured to drive clips to the clip dies for applying two side-by-side clips to a target product casing; (c) a gate assembly having a gate valve and gate cylinder that closes a gate and opens the gate; and (d) at least one external air line extending from the pulse valve to the first and second die support air channels. The punch valve or the gate valve is in fluid communication with the at least one pulse valve.

The punch valve or the gate valve (or both) of the clipper assemblies can be configured to supply pressurized gas to the pulse valve during a reset period of a respective clipping cycle.

The clipper assemblies can have a dual clipper configuration and each can operate on a synchronized clipping cycle. A clipping cycle can include electronically automatically: (i) activating a gate valve to move a gate to a closed position; (ii) confirming if a voider plate is in position; (iii) if so, activating a punch valve to move a punch cylinder to drive a punch downward to punch a clip over a target product at the clip die; (iv) directing a knife cylinder to move a knife to cut a clipped package; (v) opening the gate while retracting the knife cylinder and the punch cylinder; then (vi) directing air from the punch valve or the gate valve into the at least one pulse valve to supply the clip blow-off pulse of pressurized gas across the clip dies.

Other embodiments are directed to a clipper assembly. The clipper assembly includes at least one pulse valve in communication with at least one of a punch valve, a knife valve or a gate valve configured to generate a clip blow-off pulse of pressurized gas that is directed across a clip die.

The clipper assembly can have a single pulse valve that concurrently supplies first and second clip blow-off pulses of pressurized air to different clip dies of the dual clipper configuration.

The at least one pulse valve can be connected to (i) the punch valve or the gate valve, (ii) a downwardly extending conduit, and (iii) an extension chamber.

The clipper assembly can have a dual clipper configuration.

The systems can include a first downwardly extending external conduit with a diameter that (i) is in fluid communication with a respective pulse valve and that (ii) connects to second and third smaller diameter conduits. The second and third smaller diameter conduits can travel down a distance from the first external conduit, then turn inward. The second conduit can attach to a right hand die support and the third conduit can attach to a left hand die support. The right hand and left hand die supports can have laterally extending air channels with respective exit ports that reside adjacent a corresponding clip die and supply the pulse of pressurized gas to the corresponding clip die.

The clipper assembly can include right hand and left hand die supports with respective laterally extending channels that have an outer edge facing a respective clip die that is angled to direct the clip blow-off pulse of pressurized gas down and across a die pocket of the clip die.

The channels can be horizontal channels that merge into a curved edge to blow the air across the clip die.

The clipper assembly can include a punch cylinder in communication with a punch valve and a gate valve in communication with a gate cylinder. At least one of the at least one pulse valve can be in fluid communication with the punch valve and/or the gate valve. In operation, the punch valve or the gate valve can supply air for driving a clip down against the clip die, then supply air to the pulse valve.

The clipper assembly can include: (a) a first conduit segment that has a first end portion that is connected to a punch valve or gate valve held by the clipper assembly and has a second end portion that is connected to the pulse valve, (b) a second conduit segment that has an upper end that is attached to the pulse valve and a lower end that is attached to a connector; and (c) a third conduit segment in fluid communication with the second conduit segment, the third conduit segment having a pair of side-by-side downwardly extending conduits that have (i) an upper portion attached to the connector and (ii) a lower portion that turns inwardly to attach to respective laterally extending channels in die supports.

The clipper assembly can include a fourth conduit segment that is attached to the pulse valve at a location away from the first conduit segment and the second conduit segment and defines an extension chamber.

The clipper assembly can have a dual clipper configuration.

The clipper assembly can include: (a) first and second clip die supports holding a respective clip die, wherein the clip die supports comprise at least one gas channel therein that extends across to a respective clip blow off port proximate the clip dies; (b) a punch cylinder with a punch valve configured to drive clips to the clip dies for applying two side-by-side clips to a target product casing; (c) a gate assembly with a gate valve and gate cylinder that closes a gate and opens the gate; and (d) conduits extending from the at least one pulse valve to the die support channels. The punch valve and/or the gate valve is in fluid communication with the at least one pulse valve.

One of the at least one pulse valve can be connected to the gate valve and can be configured to supply pressurized gas to the pulse valve during a reset period of a respective clipping cycle.

The clipper assembly can have a dual clipper configuration and an automated repeating clipping cycle that includes: (i) activating a gate valve to move a gate to a closed position; (ii) confirming if a voider plate is in position; (iii) if so, activating a punch valve to move a punch cylinder to drive a punch downward to punch a clip over a target product at the clip die; (iv) directing a knife cylinder to move a knife to cut a clipped package; (v) opening the gate while retracting the knife cylinder and the punch cylinder; then (vi) directing air from the punch valve and/or the gate valve into the at least one pulse valve to supply the clip blow-off pulse of pressurized gas across the clip dies.

Still other embodiments are directed to methods of dislodging jammed clips or foreign debris from clip dies of one or more clipper assemblies. The methods include: automatically driving a punch using a punch valve with a punch cylinder of a clipper assembly to apply at least one clip to a filled casing; then automatically directing air from the punch or gate cylinder into a pulse valve; then blowing a pulse of pressurized air from the pulse valve through a channel in a die support and across a clip die to thereby dislodge clip debris or any jammed clip on the clip die.

The one or more clipper assemblies operate with a clipping cycle that includes automatically: (i) activating a gate valve to move a gate to a closed position; (ii) confirming if a voider plate is in position; (iii) if so, activating a punch valve to move a punch cylinder to drive a punch downward to punch a clip over a target product at the clip die; (iv) directing a knife cylinder to move a knife to cut a clipped package; (v) opening the gate while retracting the knife and the punch cylinder; and then (vi) automatically directing the air from the punch valve and/or the gate valve into the pulse valve for blowing the pulse of pressurized air across the clip die.

The one or more clipper assemblies can be a plurality of circumferentially spaced apart clipper assemblies held on a rotating table, wherein during the driving, directing and blowing, the rotating table rotates at a desired speed while holding the clipper assemblies, and wherein the blowing is carried out concurrently for each clipper assembly.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIG. 3C is a section view of the portion of the clipper assembly shown in FIGS. 3A and 3B.

FIG. 3D is an enlarged schematic illustration of a clip die pocket with an exemplary clip blow off gas travel path according to embodiments of the present invention.

DETAILED DESCRIPTION OF EMBODIMENTS OF THE INVENTION

Figure 1A:
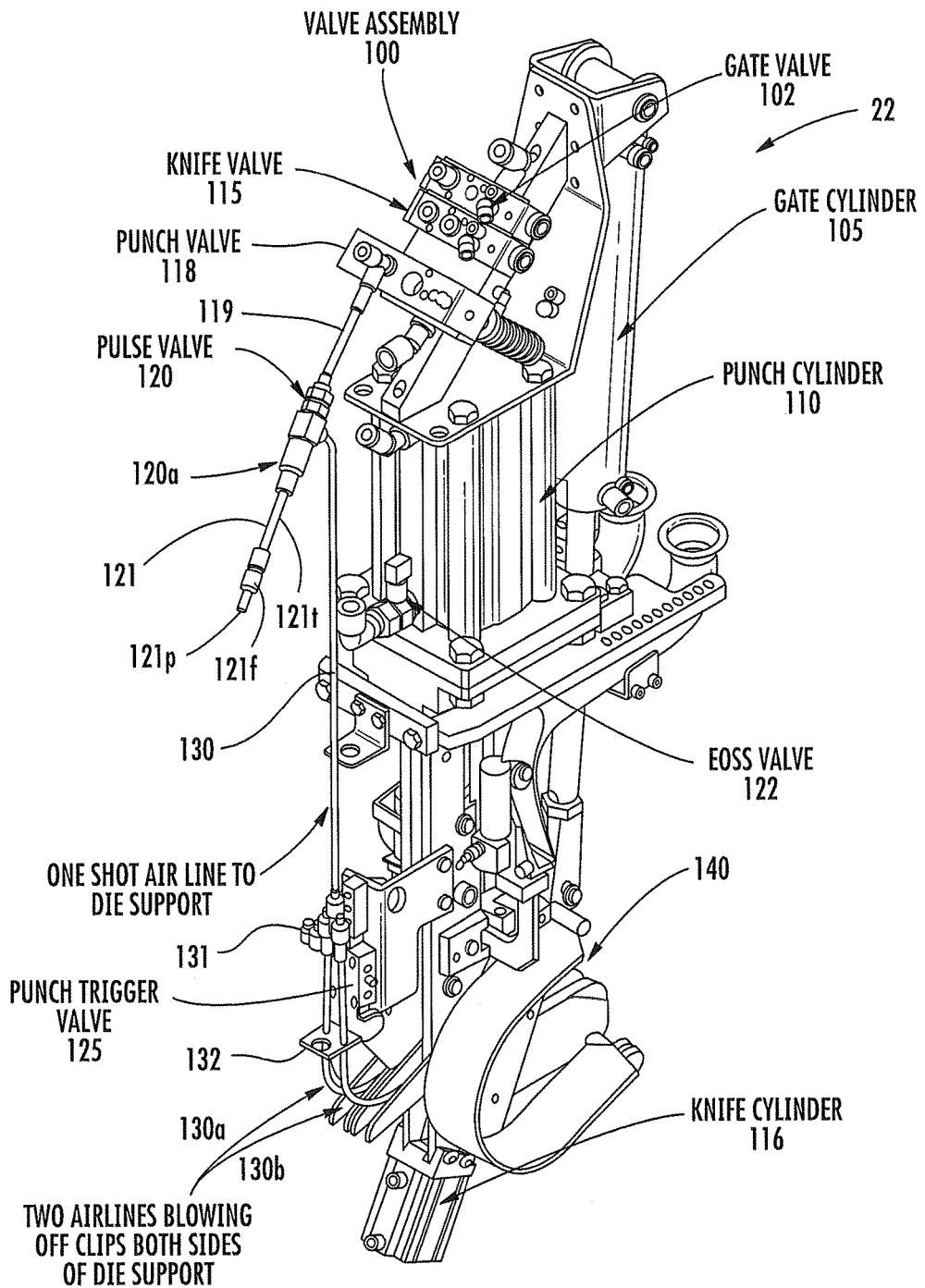
FIG. 1A is a side perspective view of a clipper assembly according to embodiments of the present invention.
Figure 1B:
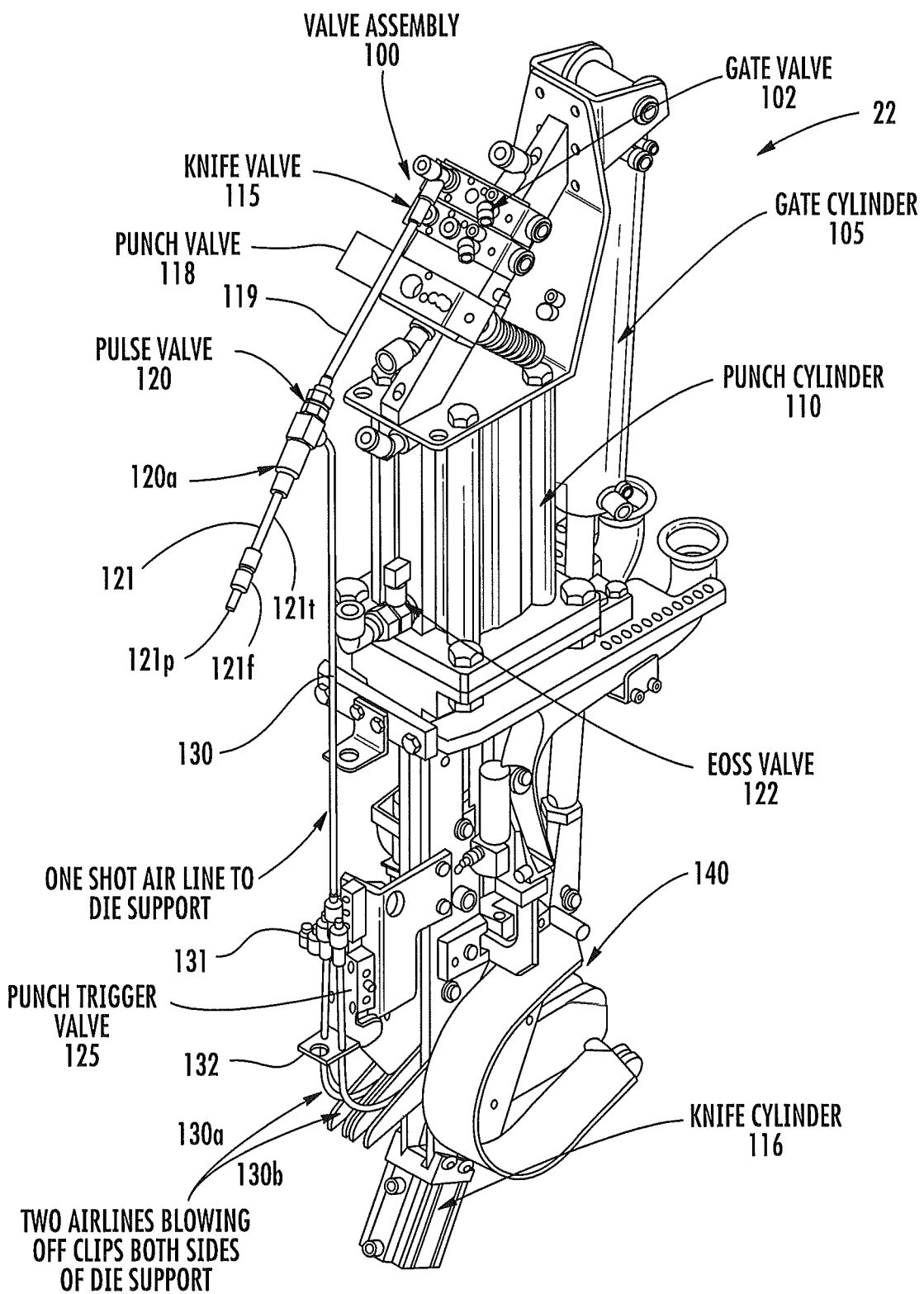
FIG. 1B is a side perspective view of a clipper assembly according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more IC (integrated Circuit) or Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. If the latter, a local computer and/or processor can communicate over a LAN, WAN and/or internet to transmit patient images.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor mount frame. The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "pie pan" refers to table members that have a wedge shape or pie-slice-like shape with a narrow end facing a center of the rotating table.

Referring now to the figures, FIGS. 1A, 1B, 2A and 2B illustrate a clipper assembly 22. The clipper assembly 22 can include a valve assembly 100 that holds a plurality of valves at a common location on a top portion of the clipper assembly 22. The valves are configured to provide pressurized gas, typically air, to defined components such as actuation cylinders or other components. However, the valves can be distributed or held separately or in different sub-combinations as subassemblies and/or positioned at other locations on the clipper assembly 22.

Figure 3A:
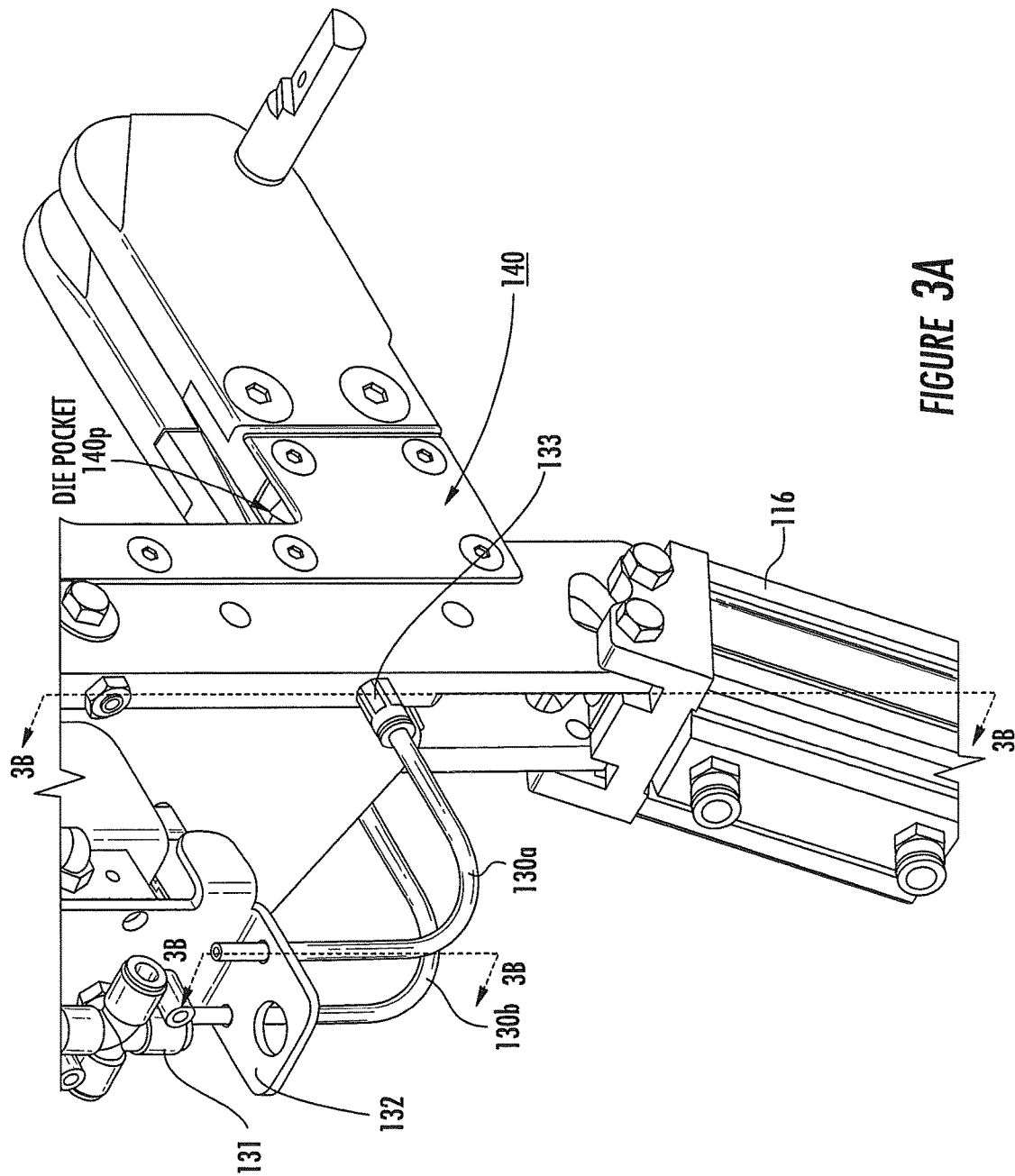
FIG. 3A is a greatly enlarged view of a portion of the clipper assembly shown in FIGS. 1A and 1B.

As shown, the valve assembly 100 includes a gate valve 102, a punch valve 118, and optionally a knife valve 115. The punch valve 118 provides pressurized air to a punch cylinder 110 that drives at least one punch 110$p$ to drive clips down to a clip die 140 (FIG. 3A) to force a respective clip to close about a target (gathered) end portion of a product in a casing as is well known to those of skill in the art.

The knife valve 115 supplies pressurized gas, typically air, to a knife cylinder 116 that can extend and retract a knife to sever clipped end portions of the casing as is well known to those of skill in the art. A mechanically driven knife may alternatively be used. The knife can be a sharp cutting implement or may comprise a laser, heater or other cutting configuration.

Figure 2A:
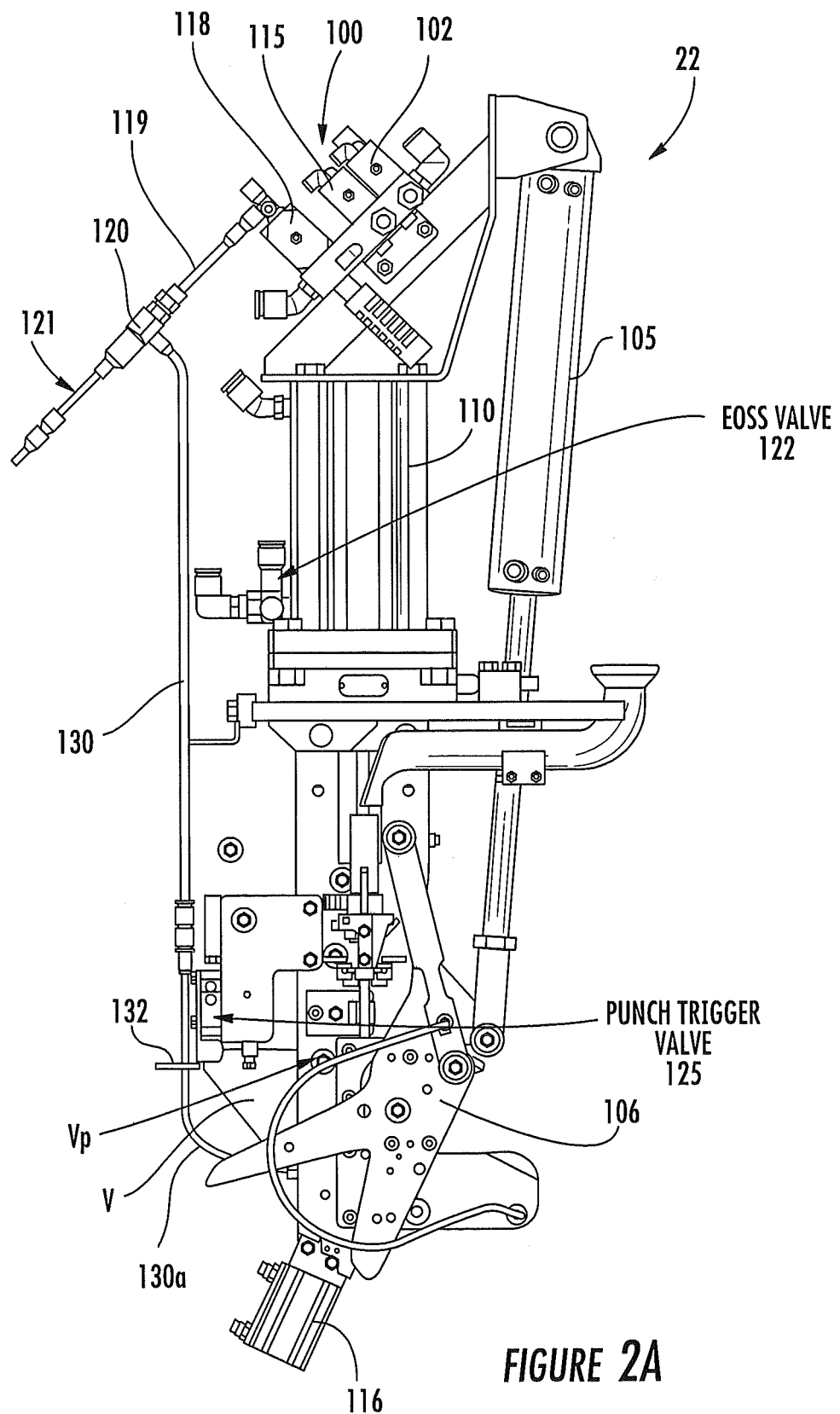
FIG. 2A is a side view of the assembly shown in FIG. 1A.
Figure 2B:
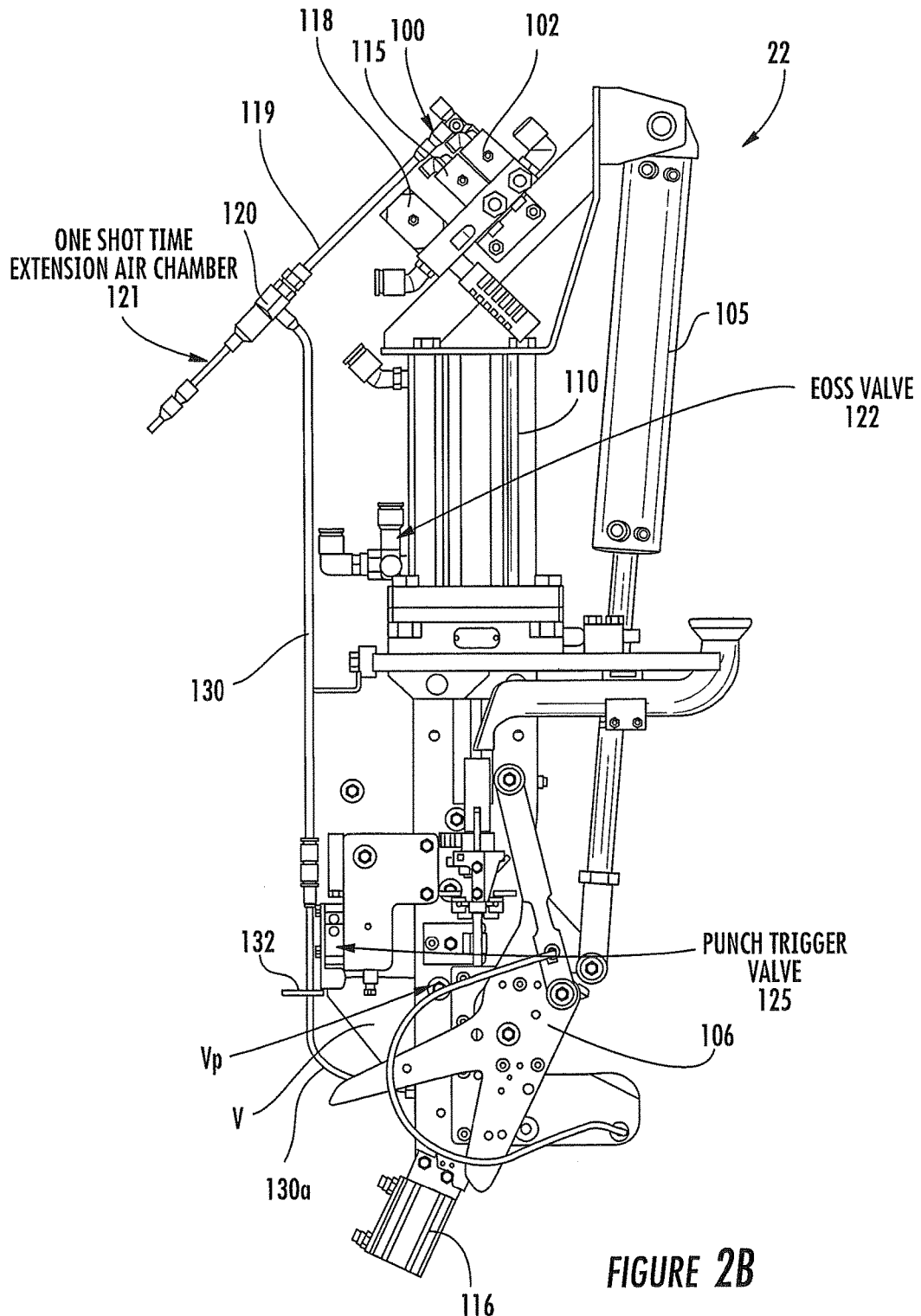
FIG. 2B is a side view of the assembly shown in FIG. 1B.
Figure 4:
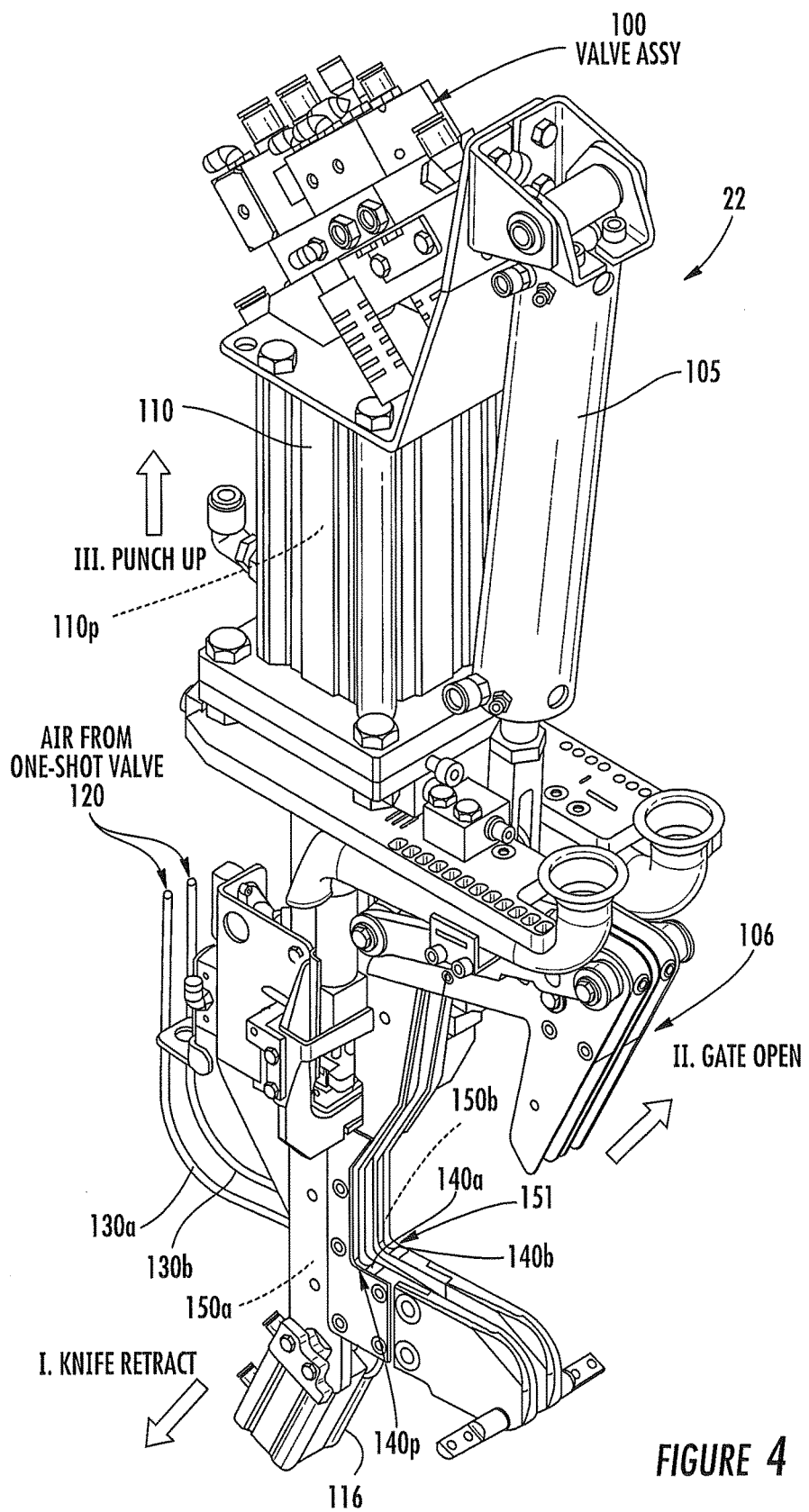
FIG. 4 is a side perspective view of a clipper assembly with components indicated in reset configuration for the clip blow off pulse according to embodiments of the present invention.

The gate valve 102 supplies pressurized gas, typically air, to a gate cylinder 105. The gate cylinder 105 moves gate 106 (FIG. 2A, 2B) in and out of operative position as is well known to those of skill in the art. FIG. 2A, 2B illustrate an extended, closed position of the gate 106 and FIG. 4 illustrates an open gate 106 configuration/position.

The clipper assembly 22 can include at least one voider plate V (FIGS. 2A, 2B, 3C) which can be pivotably attached at pivot Vp to a die support gate 145. When in a defined position, the voider plate Vp can cause the trigger valve 125 to send a signal to the punch valve 118 to initiate a clip cycle where the punch operates to punch down to apply a clip.

The clipper assembly 22 also includes at least one pulse valve 120 (also called a "one shot" valve) that is configured to generate a blast or pulse of pressurized air across the clip die 140 as the gate opens or after the gate opens. The clip blow off pulse of pressurized air 151 (schematically illustrated by the arrows over the clip die pocket 140$p$ in FIG. 3D) can have a pressure that corresponds to that used to operate the gate 106 or other components, typically between about 60-80 psig.

For clipper assemblies 22 having a dual clipper configuration, the clipper assemblies can include a single pulse valve 120 that supplies the clip blow off pressurized gas (e.g., air) pulse to both clip dies 140. Alternatively, the clipper assemblies 22 can include first and second pulse valves that connect to a common supply valve to supply respective (substantially concurrent) clip blow off pressurized air pulses to corresponding clip dies 140 of respective clippers.

Dual clipper configurations employ two punches, typically operated using a single pneumatic cylinder 110. See, U.S. Pat. No. 5,495,701, which describes a mechanism that has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. See also, U.S. Pat. No. 6,920,738 and U.S. Pat. No. 5,586,424 for discussion of clippers and movement of U-shaped clips along a rail, as well as a clip feed for advancing clips on a guide rail and an arm that is reciprocally driven by a piston and cylinder arrangement.

The contents of each of these patents are hereby incorporated by reference as if recited in full herein.

The pulse valve 120 can be in fluid communication with one of the onboard clipper valves that has another function, typically to one of the valves in the valve assembly 100. As shown, the pulse valve 120 is in fluid communication the punch valve 118. In other embodiments, the pulse valve 120 can be in fluid communication with the gate valve 102 or the knife valve 115. However, when using the knife valve, the gate 106 may not consistently or always be open when the clip blow off pulse is generated which can block the pressurized clip blow off gas from effectively blowing across the clip die 140.

It is contemplated that a plurality of pulse valves 120 can be used for a respective clipper assembly 22. Each pulse valve can connect to a different pressurized air supply valve, such as a punch valve 118 and/or a knife valve 115, and each pulse valve can then supply clip blow off air pulses to a respective clip die 140 concurrently or serially.

The pulse valve 120 can be connected to a supply valve such as a punch valve 118 (FIGS. 1A, 2A) or gate valve 102 (FIGS. 1B, 2B) via conduit 119. The pulse valve 120 can be connected to a downwardly extending conduit 130. The conduits 119, 130 can be flexible, rigid or semi-rigid (e.g., the latter meaning malleable by hand but with sufficient rigidity to hold its shape).

The end of the pulse valve 120a away from the punch valve 118 can merge into an extension chamber 121. The extension chamber 121 is configured to extend and/or control a duration of the clip blow off pressurized air pulse 151 over a duration without such an extension chamber (e.g., from about 100 ms to between about 200-3000 ms).

When the pulse valve 120 is activated, it transmits a pressurized gas (e.g., air) pulse to the conduit 130. The duration of this pulse can be determined by the attached extension chamber 121. This chamber 121 can have any suitable size and shape to provide a desired pulse length/duration. The chamber 121 can be formed using short piece of conduit or tubing 120t with a plug 121p in a fitting 121f to close the tube 121t. For example, a piece of tubing having a diameter between about 5 mm to about 25 mm and having a length between about 0.5 inches to about 5 inches may be appropriate. In some particular embodiments, the extension has a volume of between about 1 cubic inch to about 3 cubic inches and may cooperate with the valve to generate a clip blow-off pulse with a pulse duration of between about 200 ms to about 3 seconds. In some particular embodiments, where the extension chamber 120 comprises a conduit 121, it may have about a 10 mm diameter and a length of between about 5 inches to about 0.1 inches. The larger the chamber 121, the longer the gas (e.g., air) pulse.

An exemplary pulse valve 120 is a miniature pulse valve which can have a normally open 3-way valve configuration that closes shortly after being pressurized and remains closed until supply pressure is exhausted and repressurized. Miniature pulse valves are available as part number PV-1, PV-1-M5 and PV-1P, for example, from Clippard Instrument Laboratory, Inc., having a place of business in Cincinnati, Ohio (clippard.com). This valve can convert a continuous supply of inlet air into a pulse of about 100 ms (without volume chambers to extend the duration). The volume of the chamber may have a maximum size of about 3 cubic inches.

The clipper assembly 22 can have a defined clipping cycle to successively and rapidly clip lengths of filled casing. The clipping cycle includes a reset period during which the cylinders 105, 110, 116 can reset to a retracted or home position/configuration substantially simultaneously. In some embodiments, the pulse valve 120 can be configured to activate to transmit the clip blow off pulse during and/or after the reset, e.g., after and/or as the knife cylinder 116 retracts, after and/or as the gate 106 opens and after and/or as the punch cylinder 110 retracts. Within the clipping cycle, about half of the time is for clipping and resetting. The clip blow off pulse can be generated after reset during an idle period associated with the other half of the clipping cycle. The clip blow off pulse can be longer for larger volume chambers 121 from valve 120 and this does not slow down or otherwise affect the clipping process. The clip blow off pulses can be generated at between about 5-30 per minute, associated with an idle portion of each respective clipping cycle.

The clip blow off pulse 151 can have a duration of between about 100 ms (milliseconds) to about 3 seconds, typically about 500 ms to about 2140 ms per clipping cycle.

The clipper assembly 22 can have a dual clipper configuration as is well known to those of skill in the art. However, while illustrated in this configuration, the clipper assembly 22 may have a single clipper configuration.

As shown in FIGS. 1A, 1B, 2A and 2B, the conduit 130 can have a primary segment with a diameter that extends down to a coupling 131, such as a "T" coupling or other coupling that splits the primary segment 130 into two lower side-by-side segments 130a, 130b of smaller size (diameter). The lower segments 130a, 130b can have lower ends that turn inward to extend in an orientation that is substantially perpendicular to the direction at the coupling 131 and/or relative to the primary segment 130. In other embodiments, the primary conduit 130 can be omitted or made shorter. For example, the two conduits 130a, 130b can be attached directly to the valve 120 or to a coupling directly attached to the valve 120 or closely spaced apart from the valve 120 (not shown).

As is also shown in FIGS. 1A, 1B, 2A and 2B, the clipper assembly 22 can include an onboard punch trigger valve 125 and an end of stroke sensor (EOSS) valve 122, both of which are in communication with the punch 110p/punch cylinder 110 and are conventional and well known to those of skill in the art.

Referring to FIGS. 3A-3D, the clipper assembly 22 can include closely spaced apart right hand (RH) and left hand (LH) die supports 145 holding respective clip blow off air channels 150 (for dual clipper configurations) that extend across a receptive die support 145. The channels 150 have one end portion that is open and can reside proximate to and above a clip die pocket 140p.

Conduits 130a, 130b can be attached to a respective channel 150 via a coupling 133. Again, the conduits can be flexible, rigid or semi-rigid (e.g., the latter meaning malleable by hand but with sufficient rigidity to hold its shape).

Figure 3B:
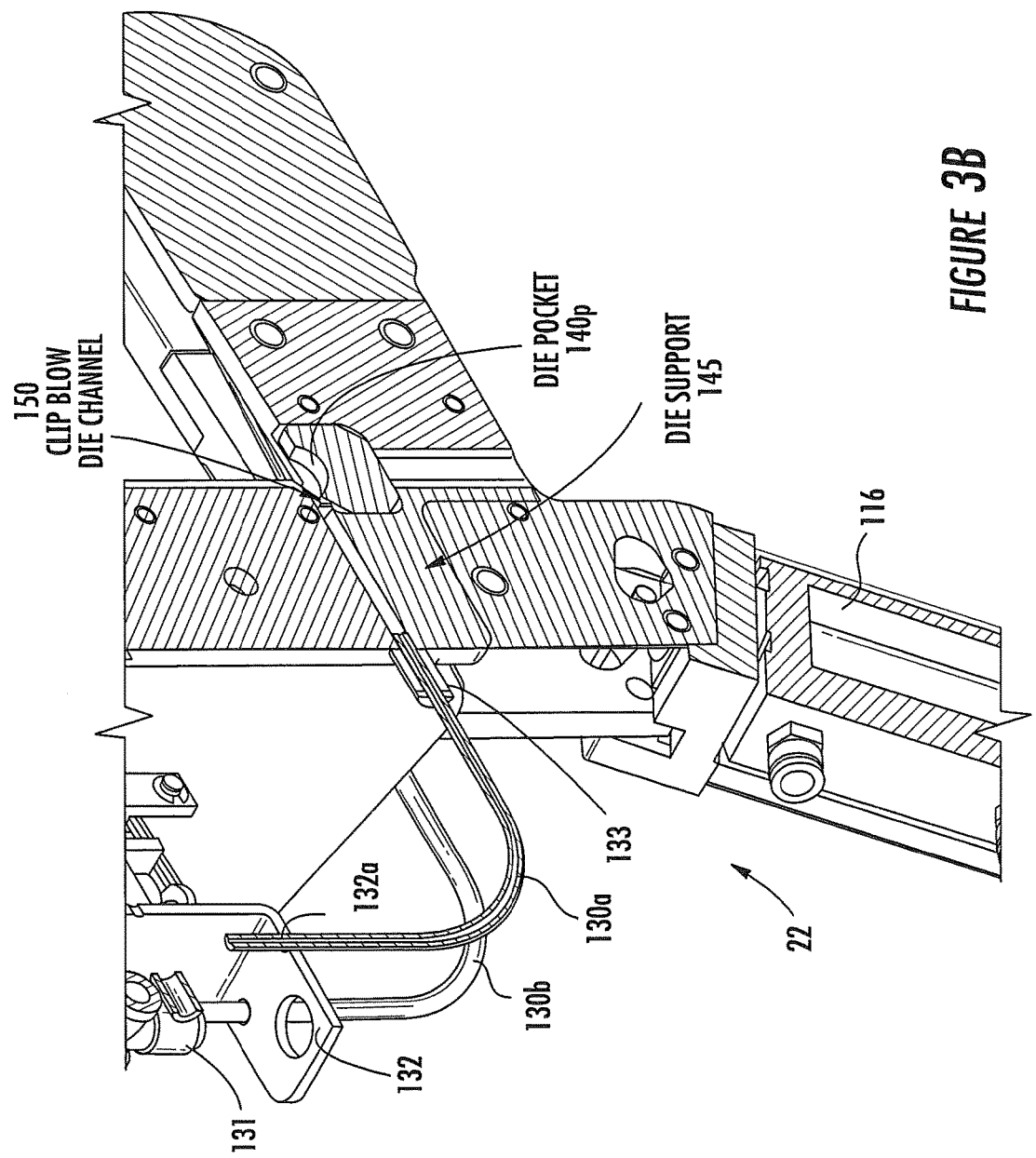
FIG. 3B is a greatly enlarged partial cutaway view of the portion of the clipper assembly shown in FIG. 3A according to embodiments of the present invention.

FIGS. 3B and 3C illustrate that the coupling 133 can have an inner end 133i that is press fit, threadably attached or otherwise attached to the outer end portion of the channel 150i.

FIGS. 3B and 3C also illustrate that the channel 150 can have an open tapered end 150e that can be configured to help direct air down and over the clip die pocket 140p. As shown, the upper edge is longer than the lower edge of the tapered end 150e. However, other configurations of the exit of the channel(s) 150 may also be used. FIG. 3D illustrates an exemplary clip blow off air pulse 151 with the successive arrows indicating a potential air flow path to help dislodge a jammed clip on the die pocket 140p.

As shown, the channels 50 can extend straight (horizontally) across the die support 145 or may be curvilinear. The channels 150 may alternatively angle (between vertical and horizontal) across the die support 145 rather than be horizontally oriented as shown. The channels 150 can be machined into the die supports 145. The channels 150 can have a cross-sectional size that is typically between about 0.08 inches to about ¼ inches, more typically about ⅛ of an inch in diameter. In some embodiments, the channels 150 can enclose flexible, rigid or semi-rigid conduits that extend therethrough to connect to the external conduits 130a, 130b, but typically the die supports define the walls of the flow channels 150 so that the pulse of pressurized air contacts the respective wall. Typically, there is one flow channel 150 for one die pocket 140p but a plurality of such channels for each die pocket 140p/clip die 140 can be used. If so, the channels 150 can merge to a single exit port or a plurality of closely spaced apart exit ports adjacent the respective clip die 140 and/or clip die pocket 140p to discharge the clip blow off gas pulse (not shown).

The clipper assembly 22 can include a bracket 132 with apertures 132a that allow the lower conduits 130a, 130b to extend therethrough.

FIG. 4 illustrates exemplary configurations/status of components of the clipper assembly 22 when the clip blow off pulse is generated to blow through the RH and LH channels 150a, 150b and across the clip die pocket 140p of clip dies 140a, 140b. I. The knife is retracted (indicated by the downward arrow at the knife cylinder 116). II. The gate 106 is open. III. The punch 110p is up (indicated by the upward arrow at the cylinder 110. The clip blow off pulse 151 is blown through the channels 150a, 150b, out the ends 150e thereof and across the clip dies 140a, 140b with respective clip die pockets 140p. The punch cylinder 110 may have a punch cylinder pressure regulator setting that is lower than the gate 106 and knife cylinder 105, 116. The knife cylinder and gate cylinder 105, 116 may retract faster than the punch cylinder 110, even when the three cylinders 105, 110, 116 are reset substantially simultaneously (within about 1 s) if not simultaneously.

In some embodiments, when the punch 110p is down or extended, pressure is removed from conduit 119 and pressure can be restored in conduit 119 when (during or after) the punch travels back up (e.g., is in a home position) which can charge the pulse valve 120 to generate the clip blow off pulse. In other embodiments, the gate is opened, the knife cylinder retracted and the punch cylinder retracts or is retracted, then the gate-up valve 102 feeds the pulse valve 120 to generate the clip blow off pulse.

In some embodiments, the packaging system 10 can comprise twelve clipper assemblies 22, but less or even more may be used. The system 10 can be configured to have a (maximum) speed of about 334-350 pieces per minute. The rate can be about 334/(12)—which is about 28 cycles per minute. Of course, the rate can be less than about 28 cycles per minute.

Figure 5A:
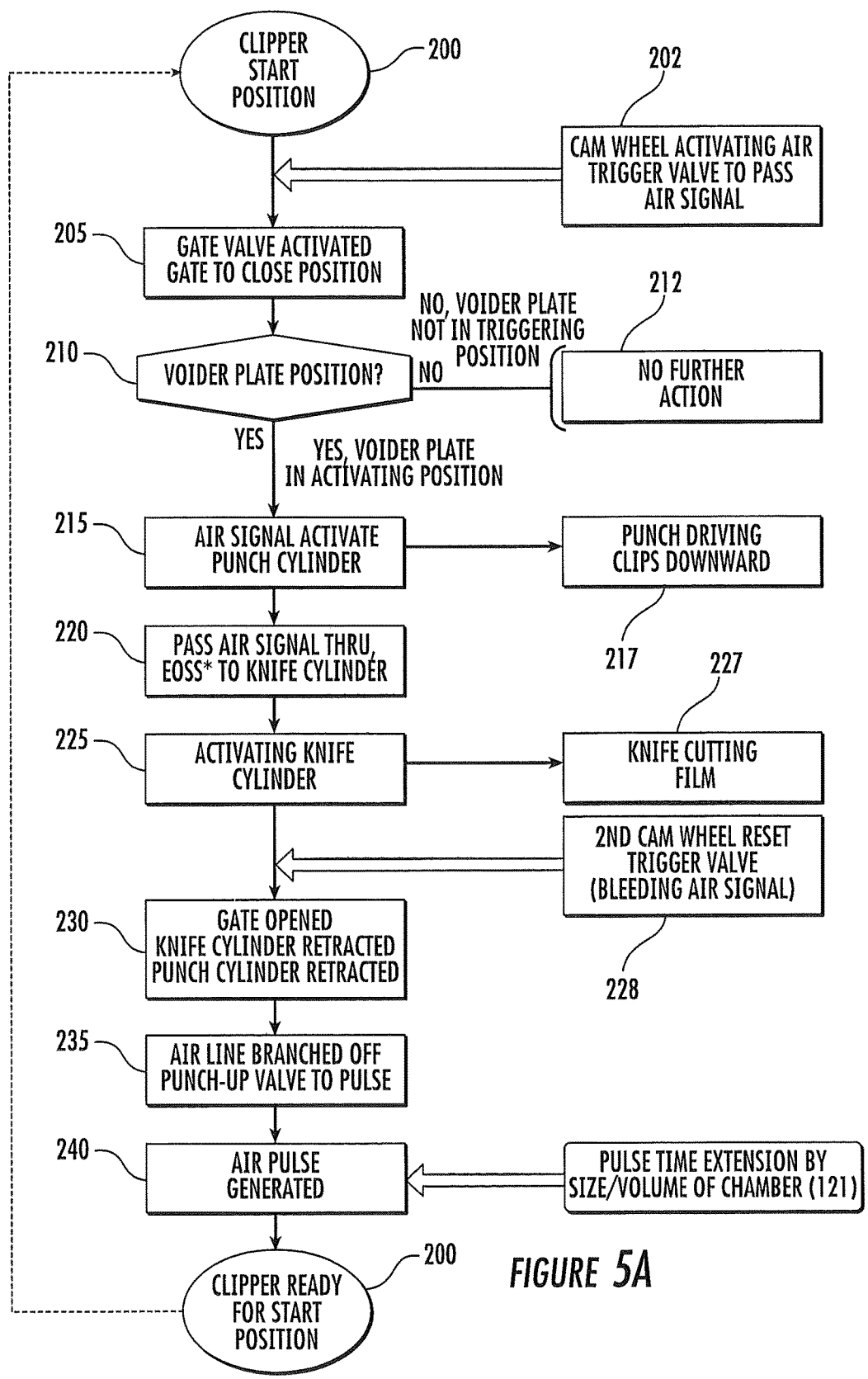
FIG. 5A is a flow chart of exemplary actions that can be used to carry out embodiments of the present invention.

FIG. 5A illustrates an exemplary (successively repeatable) clipping cycle having a clip blow off operation according to some embodiments of the present invention. As shown, the clipper assembly has a start position (block 200).

Figure 6:
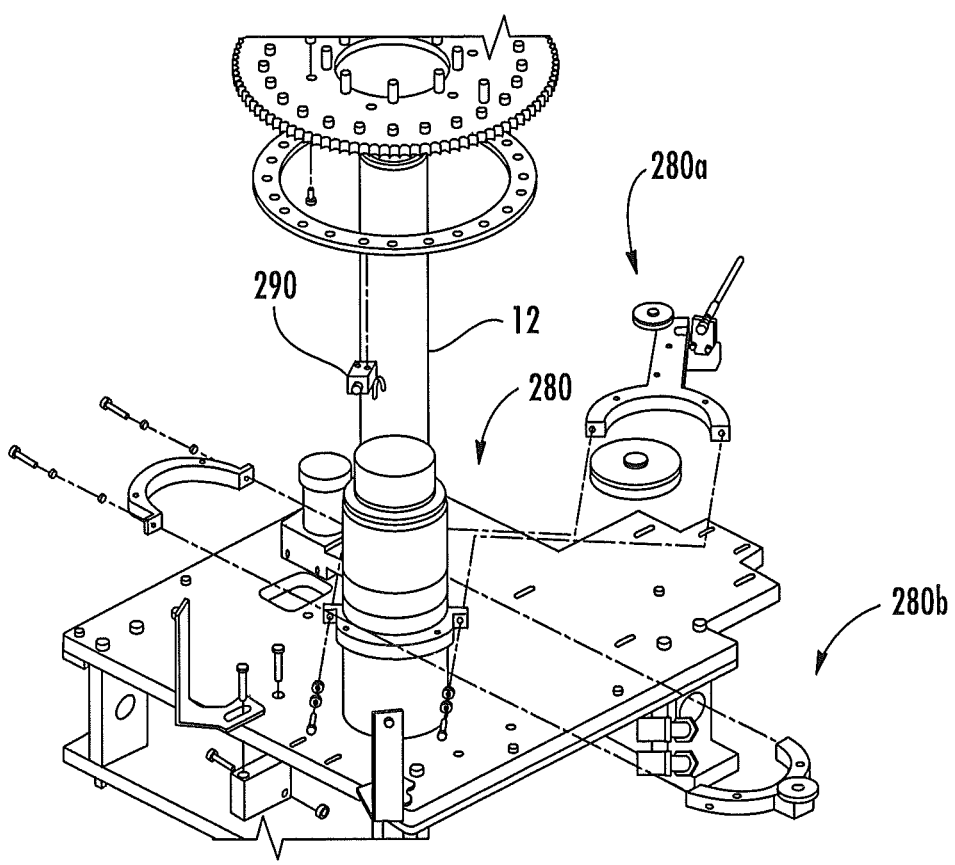
FIG. 6 is a partial exploded view of a portion of a rotating table multi-clipper packaging system according to embodiments of the present invention.

Optionally, a cam wheel assembly 280 can be used to activate an air trigger valve 290 to pass an air signal (block 202). FIG. 6 illustrates an activated cam wheel 280a and a deactivated cam wheel 280b as well as a four-way two position trigger valve (mechanical air valve), one for each clipper assembly 22 and/or respective clipper station 22s.

Referring again to FIG. 5A, the gate valve 102 is activated to move the gate 106 to a closed position (block 205). A sensor can detect whether a voider plate is in position (block 210). For safety, further action can be prevented if the voider plate is not in its operative position (block 212). If yes, an air signal can activate the punch cylinder (block 215). This drives the clips downward over and into the clip die (block 217). The air signal is passed through the FOSS to the knife cylinder (block 220). The knife cylinder is activated (bock 225). The knife then cuts the casing (block 227).

Optionally, the second cam wheel can reset the trigger valve (bleeding air signal) (block 228).

Figure 5B:
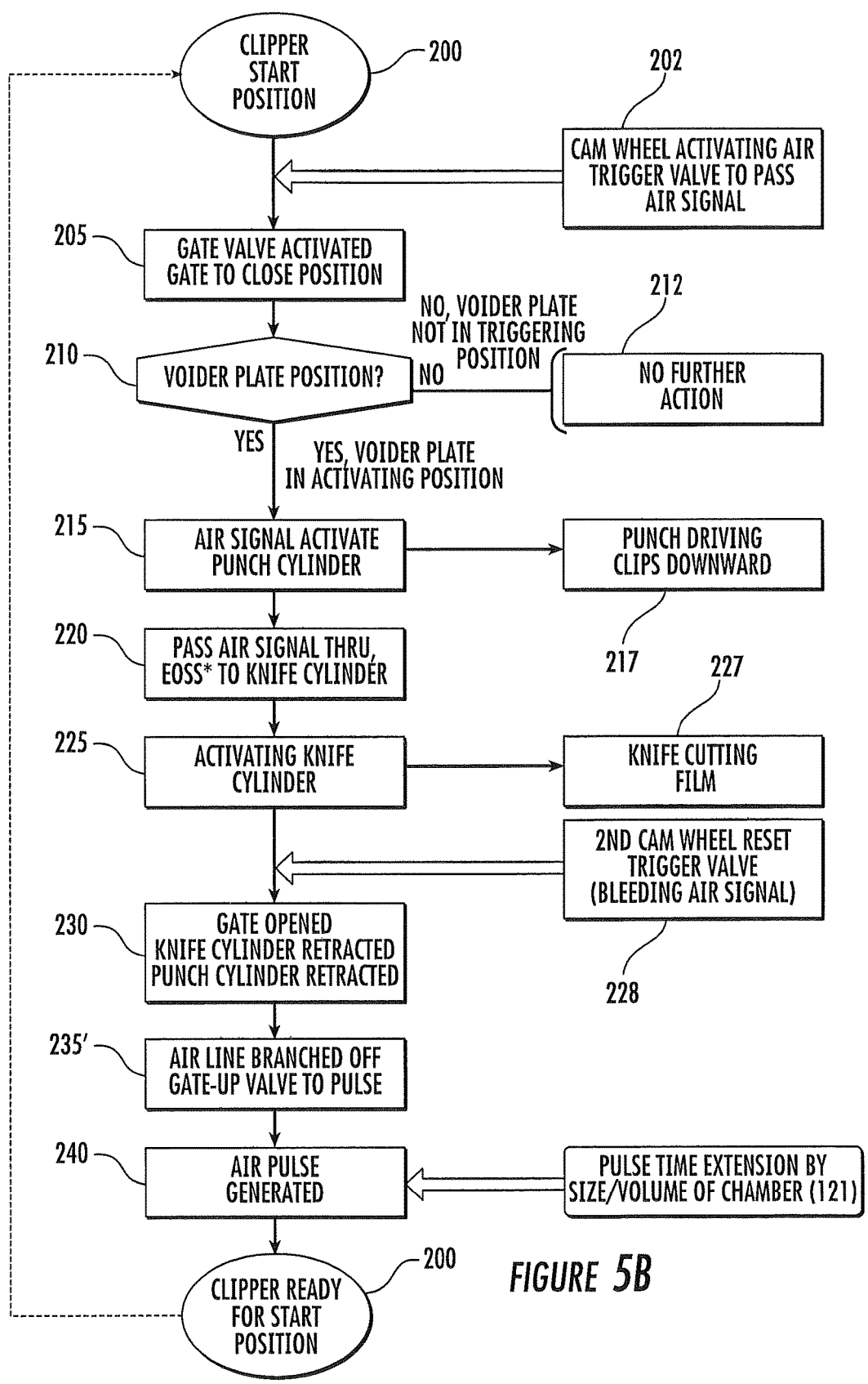
FIG. 5B is a flow chart of exemplary actions that can be used to carry out embodiments of the present invention.

The gate can be opened, the knife cylinder retracted and the punch cylinder retracted (block 230). Air can be branched off from the punch valve to the pulse valve (block 235) to generate the clip blow-off air pulse. Alternatively, as shown in FIG. 5B, the air line branches off the gate-up valve to generate a supply of air for the pulse valve (block 235'). The clip blow-off air pulse can be generated by the pulse valve (block 240). The clipper is ready for a subsequent cycle in the start position (block 200) to repeat the cycle.

In some embodiments, the clipper assemblies 22 can form part of a packaging system 10 (FIGS. 8-11). The system 10 can include a rotating table 21, column 12 and a plurality of circumferentially spaced apart clipper assemblies 22 that can be configured to operate off a common pressurized air source P with a concurrent clipping cycle.

The system 10 can have circumferentially spaced apart clipper stations 22s that holds respective clipper assemblies 22 (FIG. 9), typically double clippers. The system 10 also includes a drive system 20d that rotates the column/table at a desired speed and can automatically vary the speed depending on production requirements/inputs.

The air supply lines L that connect to the various clippers can travel down the column 12 (inside a casing) to an air supply. The system 10 can include a single common main air supply P (FIGS. 7, 9) that can be diverted to feed all of the clipper assemblies 22. Alternatively, each or groups of the clipper assemblies may have a dedicated discrete air supply. Each clipper assembly 22 can include on-board air supply conduits/lines with valves that releasably connect to the air supply lines L on the column 12. There can be two conduits L for each clipper station 22s form a common pressurized gas (air) source that can be routed up under or over the column 12. The main air supply can be provided at any desired operating pressure sufficient to run the clippers at a desired speed, typically provided at a pressure between about 80-125 psi. Each cylinder 105, 110, 116 can have a pressure regulator that controls an operational pressure that can allow for variation in pressure between components.

Optionally, the system 10 can interchangeably operate with large and small clipper assemblies 22 which can interchangeably attach to the air supply lines at each clipper station 22s on the platform 20 and the clip air supply lines L on the platform can have standardized fittings that interconnect to each type of clipper assembly.

The system can be configured to clip encased elongated or tubular product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand, explosives and the like or other flowable or emulsion materials including wet pet food (similar to that held conventionally in cans) or other powder, granular, solid, semi-solid or gelatinous materials. The product may be a packaged in any suitable industry including food, aquaculture, agriculture, environment, chemical, explosives, or other applications.

Embodiments of the present invention are particularly suitable for producing encased products using the clippers to apply clips to seal or clip end portions of long products held in the casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. When used with food products, the film, casing or covering should be food-compatible. The film/casing can be sealed in situ during operation at a speed that feeds the rotating table of clippers at a desired production speed.

Turning again to FIGS. 7-9, although shown as including twelve clipper stations 22s with respective (typically dual) clipper assemblies 22, not all clipper assemblies 22 need be operational during a particular cycle and/or packaging operation (e.g., alternating ones can be deactivated). The table 20 may include other numbers of clipper assemblies 22, typically between 10-14. Exemplary Rota-Clip® systems are available from Tipper Tie, Apex, N.C. Further description of exemplary components and operation are described by the patents incorporated by reference in the Background section of this document. Further, although shown with an adhesive seal system, tape or heat band seal systems may also or alternatively be used.

The number of clipper assemblies 22 used in combination with the circumference of the table 20, and/or the radially adjusted position of the clipper assemblies 22 on the table 20 can allow for different lengths of end product to be produced. For example, for the same clipper radial positions, one operation using all twelve clipper assemblies 22 can produce a six-inch product and, if every other clipper assembly 22 is deactivated, up to a 36 inch product. Larger and smaller length sizes can be achieved using alternate configurations.

As with conventional rotating platform clippers, in operation, the sealed filled tubular covering or casing can be clipped under the platform table surface.

In some embodiments, the table 20 can accept different sized clippers 22, such as a "100" series clipper available from Tipper Tie, Inc., Apex, N.C. and a "200" series clipper available from Tipper Tie, Inc., Apex, N.C. The 100 series can have a 100T clip size and the 200 series clipper can operate with a Z200 clip size.

Figure 7:
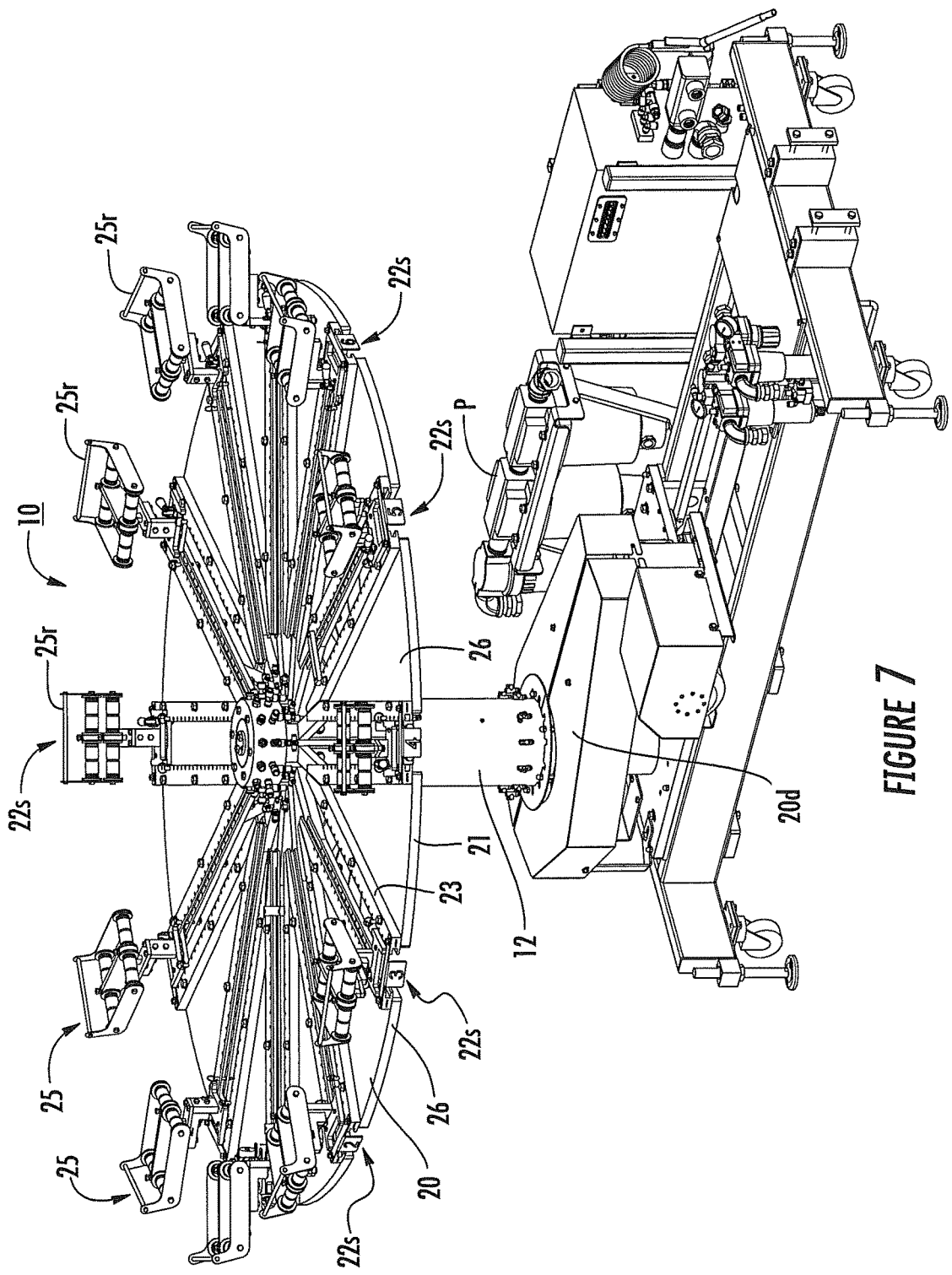
FIG. 7 is a side perspective view of a rotating table, multiple-clipper packaging system (sans clipper assemblies) according to embodiments of the present invention.
Figure 8:
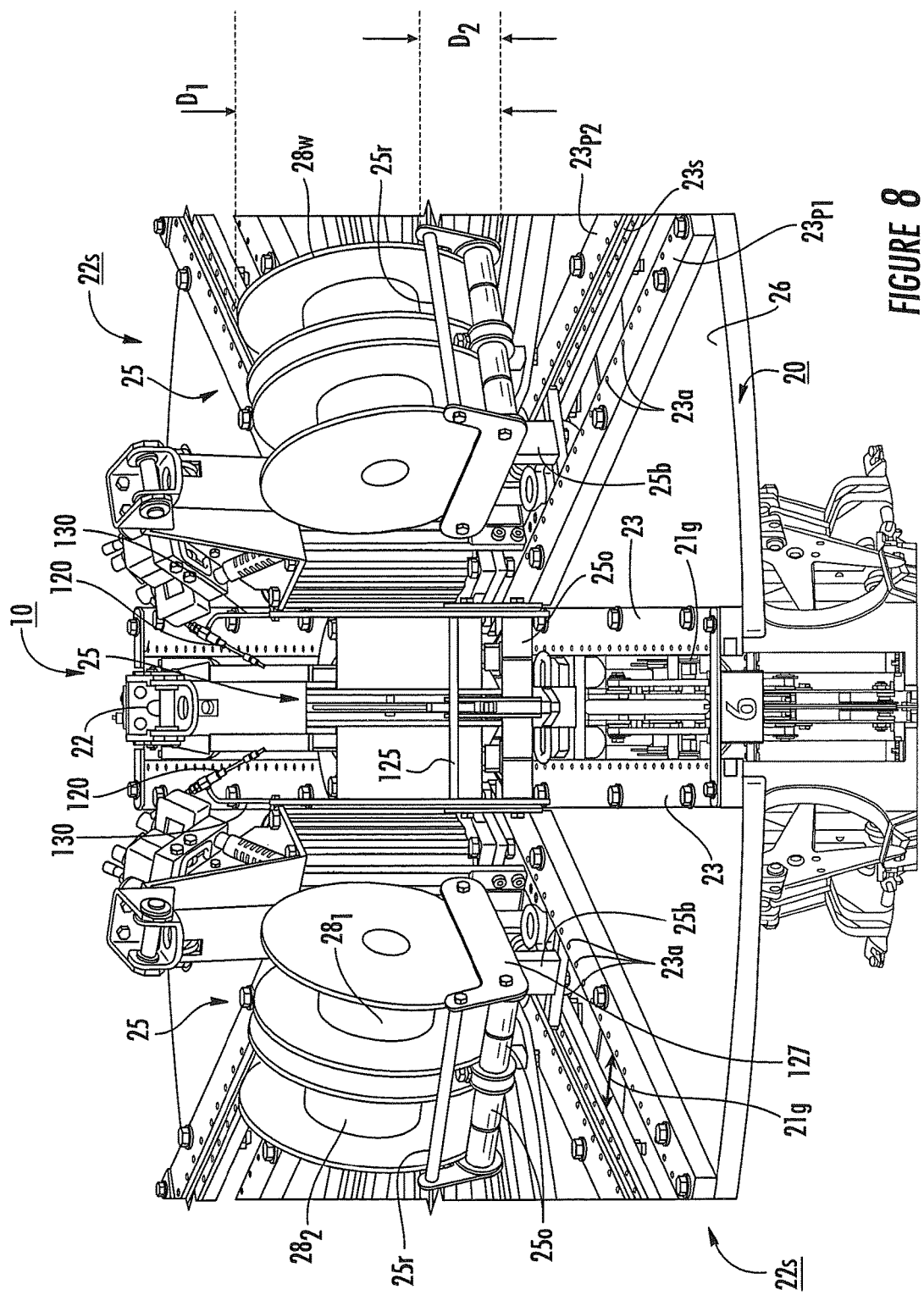
FIG. 8 is an enlarged partial view of the packaging system shown according to embodiments of the present invention.
Figure 9:
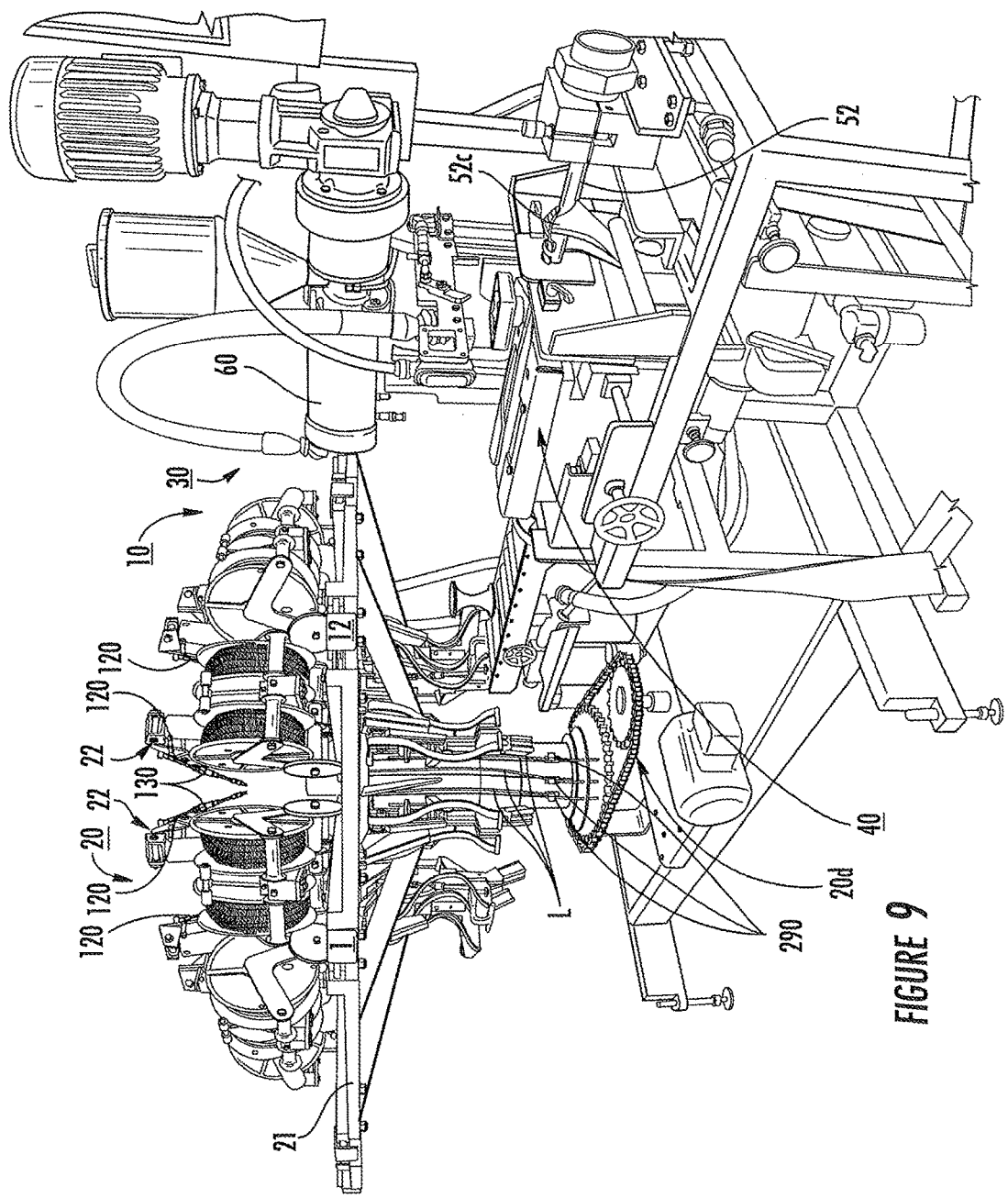
FIG. 9 is a side perspective view of a packaging system with a film forming module and optional adhesive casing seal module according to embodiments of the present invention.

FIGS. 7-9 illustrate that the table 20 can have circumferentially spaced apart pie pan members 26 (shown as 12 such members) that hold spaced apart plates $23p_1$, $23p_2$, on long ends thereof. The plates $23p_1$, $23p_2$ are typically mounted to an upper surface of the pie pan members 26, but they can be mounted to the lower surface of the pie pan members 26, in other embodiments. Cooperating pairs of the plates $23p_1$, $23p_2$ on neighboring pie pan members 26 can be configured and/or oriented to provide cooperating slots 23s that face each other across a radially extending gap 21g. Each of the plates $23p_1$, $23p_2$ can include (typically laterally aligned) radially spaced apart apertures 23a that releasably receive a respective locking pin to hold a clipper assembly 22 in a desired radial position on the table 20. The plates $23p_1$, $23p_2$ can be configured as U-channel members with the long "arms" of the U oriented horizontally and the open end of the U facing across the gap space 21g to form the cooperating slot 23s. In other embodiments, the plates $23p_1$, $23p_2$ can provide suitable slots in other manners, e.g., via cooperating separate upper and lower plate pairs, for example.

FIG. 7 illustrates a spool mount assembly 25 that has at least one spool cavity 25c (also called a "cradle"), typically two side-by-side spool cavities for double clipper operation. When assembled, the spool mount assembly 25 can releasably hold a spool of clips in a respective cavity at respective clipper stations 22s. FIGS. 8 and 9 show that the spool mount assembly 25 can hold first and second clip spools $28_1$, $28_2$ side by side at respective clipper stations 22s on the table 20.

Optionally, as shown in FIG. 7, the spool mount assembly 25 can include at least one laterally extending retainer shaft 25r that, in position, faces the outer perimeter of the table 20 (in a direction away from the clipper and table center). The retainer shaft 25r can be of any suitable size and shape. The shaft can be tubular with a circular profile or may have another shape. The retainer shaft 25r can have a cross-sectional shape that is smaller than that of the adjacent roller/outer member 25o. Although shown as a single shaft 25r that extends across both of the side by side cavities 25c of a respective spool mount assembly, each cavity 25c can have its own retainer shaft rather than a single shaft that extends across both cavities. Further, a plurality of vertically spaced apart, laterally extending retainer shafts 25r can be used. Also, the shaft 25r can be configured to laterally extend over only a portion of the cavity 25c. The retainer shaft 25r can extend in a direction that is orthogonal to the radially extending split lines 21g and/or across the spool width and can be configured to abut the outer perimeter of the circular spool walls 28w during operation.

The retainer shaft 25r can be configured to trap/retain the spool 28 in the cavity of the spool assembly 25c during rotation when exposed to centrifugal forces that might otherwise eject the spools from the spool mount assembly 25 when the spool mount assembly is located at an outer portion of the table (e.g., the position shown in FIG. 7), at certain rotational speeds and/or acceleration, particularly when used to produce certain longer length products, e.g., at a rotational speed of between about 25 RPM to about 29 RPM, including at least 25 RPM to 29 RPM. In some embodiments, at 29 RPM, the system 10 can produce 350 pieces per minute.

The spool mount assembly 25 can be configured for rapid clip spool load and reload as the clipper 22 remain in position while the clip spool 28 with the clips can be easily inserted or loaded (e.g., placed or dropped) into the cavity 25c of the spool mount assembly 25. The spool can reside in the respective spool cavity 25c of the spool mount assembly 25 otherwise unconstrained but for the centrifugal retention provided by the retainer shaft 125. The spool mount assembly 25 can have two cavities 25c that can be configured to snugly hold two side-by-side clip spools $28_1$, $28_2$. As shown in FIG. 8, the assembly 25 is aligned with and can be mounted to the clipper station 22. The assembly 25 can be attached to only the table (e.g., mounted to the cooperating plates $23p_1$, $23p_2$) and can be unattached to the clipper to thereby reduce vibrational forces thereon during production.

The spool mount assembly 25 can be configured to define two spool holding cavities 25c that extend radially between inner and outer, radially spaced apart, rigid (typically elastomeric) tubular bars or rollers, 25i, 25o, respectively. The cavities 25c can optionally be configured to hold different size clips (such as the "100" and "200" size clips and associated clippers available from Tipper Tie, Inc., Apex, N.C.). The spool width for each different clip size can be substantially the same. As noted above, the spool mount assembly 25 can include a base 25b that radially slides into the slots 23s to a desired mounting location on the platform or table 20.

FIG. 9 illustrates the rotating table 21 can be in alignment with a film forming module 52 with collar 52c, a film drive assembly 40 and an adhesive seal system 60 that seal long edges of tubular shaped flat roll stock film downstream of the forming collar 52c. As noted above, tape or heat band or other seal systems may also be used.

The system 10 can include a Siemens variable frequency drive and integral safety system, including, for example, a Siemens Step7 300 Processor with Integral Safety Systems, including a Siemens touch screen, motor drives and safety modules. The touch screen can include a series of iconic and/or pictorial image display of user-activated or status indicating features for various components, e.g., adhesive nozzle down, pump "on or off" and the like. The electric motors can be servo motors such as available from Elwood Getty. The system can include automatic positioning of vacuum belt drives. The system 10 can be Ethernet ready for remote access via VPN and may also be PROFIBUS ready, foreign language supported. In some embodiments, the system 10 can be configured to operate with an automated synchronized drive control system that may use a single virtual axis for ramp-up to maximum operational speed that synchronizes the covering (e.g., film) drive, the adhesive extruder drive and the rotating table drive (using the Siemens or a similar variable frequency drive system). Each drive system can operate at a selected (variable or constant) speed. The film and extrusion drive can operate to provide sealed tubular covering at any desired speed, including between about 10-300 feet per minute, typically between about 150-300 feet/min; more typically, the machine can operate at an operating speed of about 300 feet/minute.

The operation and sequence of events and can be controlled by a programmable logic controller (PLC). The operational mode and certain input parameters or machine controls can be selected or controlled by an operator input using a Human Machine Interface (HMI) to communicate with the controller as is well known to those of skill in the art.

The flow chart illustrates the architecture, functionality, and operation of possible implementations of embodiments of the present invention. In this regard, each block in the flow chart represents a module, segment, mechanical action or portion of code, which comprises one or more executable instructions for implementing the specified function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A packaging system comprising:
    a rotating table; and
    a plurality of circumferentially spaced apart clipper assemblies held at respective clipper stations, each clipper assembly comprising at least one pulse valve in communication with a pressurized gas supply configured to generate a respective clip blow-off pulse of pressurized gas across a clip die.

2. The system of claim 1, wherein each clipper assembly has a single pulse valve that concurrently supplies first and second clip blow-off pulses of pressurized air to different clip dies.

3. The system of claim 1, wherein each clipper assembly pulse valve is connected to (i) at least one of a punch valve, a gate valve or a knife valve, (ii) a downwardly extending conduit, and (iii) an extension chamber.

4. The system of claim 3, wherein the gate valve or the punch valve of the clipper assemblies are configured to supply pressurized gas to the pulse valve during a reset period of a respective clipping cycle.

5. The system of claim 3, wherein the clipper assemblies can operate on a synchronized clipping cycle, wherein a clipping cycle includes electronically automatically: (i) activating a gate valve to move a gate to a closed position; (ii) confirming if a voider plate is in position; (iii) if so, activating a punch valve to move a punch cylinder to drive a punch downward to punch a clip over a target product at the clip die; (iv) directing a knife cylinder to move a knife to cut a clipped package; (v) opening the gate while retracting the knife cylinder and the punch cylinder; then (vi) directing air from the punch valve or the gate valve into the pulse valve to supply the clip blow-off pulse of pressurized gas across the clip dies.

6. The system of claim 1, wherein each clipper assembly comprises a downwardly extending first conduit with a diameter that has an upper end portion that is in fluid communication with a respective pulse valve and that has an opposing lower end portion that connects to second and third smaller diameter conduits, wherein the second and third smaller diameter conduits travel down a distance from the first conduit lower end portion, then turn inward at an angle that is substantially orthogonal to the first conduit, and wherein the second smaller conduit attaches to a right hand die support and the third smaller conduit attaches to a left hand die support, and wherein the right hand and left hand die supports have laterally extending air channels with respective exit ports that reside adjacent a corresponding clip die and supply the pulse of pressurized gas to the clip dies.

7. The system of claim 1, wherein the at least one pulse valve of each clipper assembly resides proximate an upper portion of the clipper assembly, and wherein each clipper assembly includes at least one external downwardly extending conduit with upper and lower ends, wherein the upper end is configured to attach directly or indirectly to a respective pulse valve and the lower end is configured to attach directly or indirectly to a die support with a laterally extending channel that merges into an open end with a clip blow off port proximate the clip die.

8. The system of claim 1, wherein the clipper assemblies comprise right hand and left hand die supports with respective laterally extending channels that have an outer edge facing a respective clip die that is angled to direct pressurized air from the laterally extending channels down and across a die pocket of the clip die.

9. The system of claim 1, wherein the clipper assemblies each include a punch cylinder in fluid communication with a punch valve and a gate cylinder in communication with a gate valve, and wherein the gate valve is in fluid communication with the at least one pulse valve such that the gate valve supplies pressurized air to the pulse valve.

10. The system of claim 1, wherein each clipper comprises a downwardly extending external conduit that has an upper end that is directly or indirectly attached to a respective pulse valve and a lower end that directly or indirectly connects to a channel extending across a die support to supply the clip blow off pulse to the clip die.

11. The system of claim 1, wherein each clipper assembly comprises:
- a first external conduit segment that has a first end portion that is connected to a punch valve or a gate valve held by a respective clipper assembly and that has a second end portion that is connected to one or more of the at least one pulse valve;
- a second external conduit segment that has an upper end that is attached to a corresponding one or more of the at least one pulse valve and a lower end that is attached to a connector; and
- a third external conduit segment with a pair of side by side downwardly extending conduits that are in fluid communication with the second external conduit and have respective upper ends that attach to the connector and extend down a distance therefrom, then turn inward to attach to respective laterally extending channels in die supports.

12. The system of claim 11, wherein each clipper assembly further comprising a fourth external conduit segment that is attached to an end of the pulse valve at a location that is spaced apart from the first conduit second end portion and defines an extension chamber.

13. The system of claim 1, wherein each clipper assembly further comprises:
- at least one clip die support holding a respective clip die, wherein the at least one clip die support comprises at least one air channel therein that extends across to an exit port adjacent the clip die;
- a punch valve, punch cylinder and punch for applying clips to a target product casing;
- a gate assembly having a gate valve and gate cylinder that closes a gate and opens the gate; and
- at least one air line extending from the pulse valve to the at least one die support,
- wherein the pressurized gas supply for the pulse valve is provided by the punch valve or the gate valve, wherein, in operation, the clip blow-off pulse of pressurized air travels from the pulse valve to the at least one air line, then to the air channel and out of the exit port.

14. The system of claim 1, the clipper assemblies further comprising:
- first and second clip die supports holding a respective clip die, wherein the first and second clip die supports comprise at least one air channel therein that extends across to a respective clip blow off port proximate a corresponding clip die;
- a punch cylinder with a punch valve configured to drive clips to the clip dies for applying two side-by-side clips to a target product casing;
- a gate assembly having a gate valve and gate cylinder that closes a gate and opens the gate; and
- at least one external air line extending from the pulse valve to the first and second die support air channels,
- wherein at least one of the punch valve or the gate valve is in fluid communication with the at least one pulse valve.

* * * * *